April 30, 1935.  P. N. BRAUN  1,999,439
LIQUID OR WATER LEVEL CONTROL
Filed Feb. 10, 1932  2 Sheets-Sheet 1
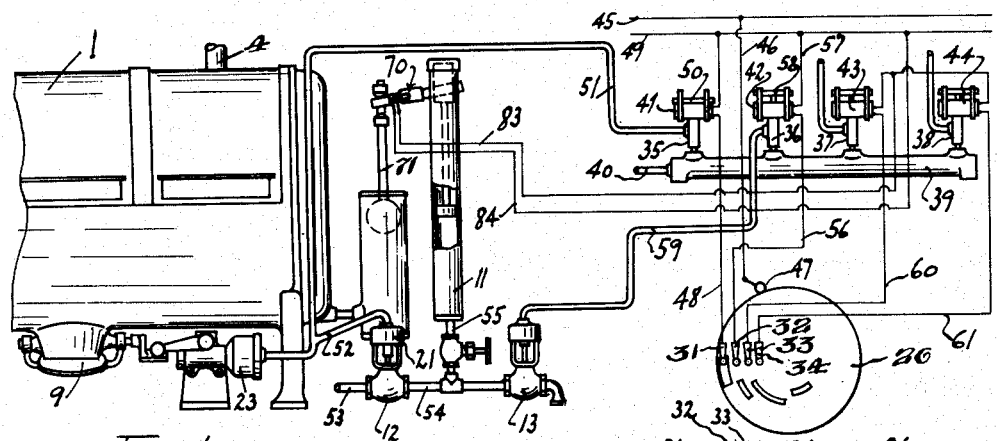
FIG. 1.
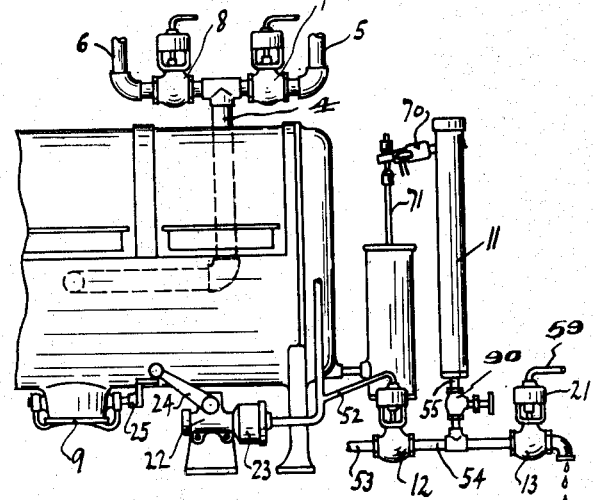
FIG. 2.
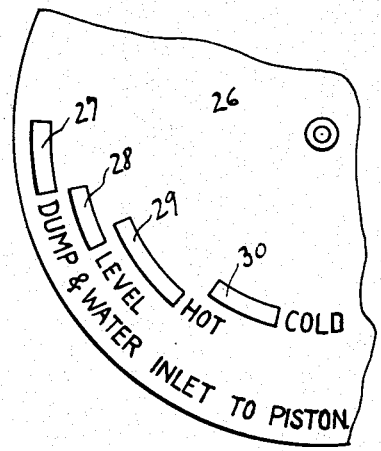
FIG. 9.
FIG. 8.
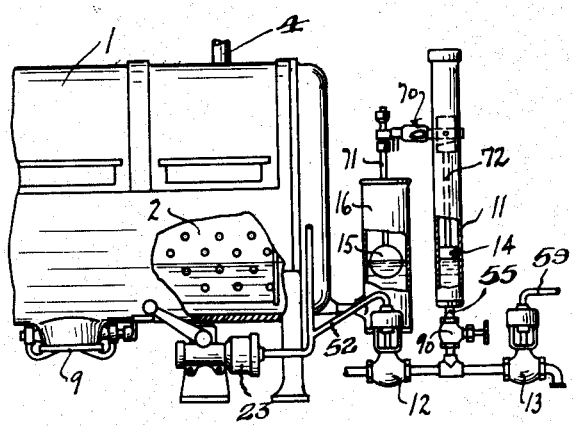
FIG. 3.
INVENTOR.
Philip N. Braun
BY Bodell + Thompson
ATTORNEYS.

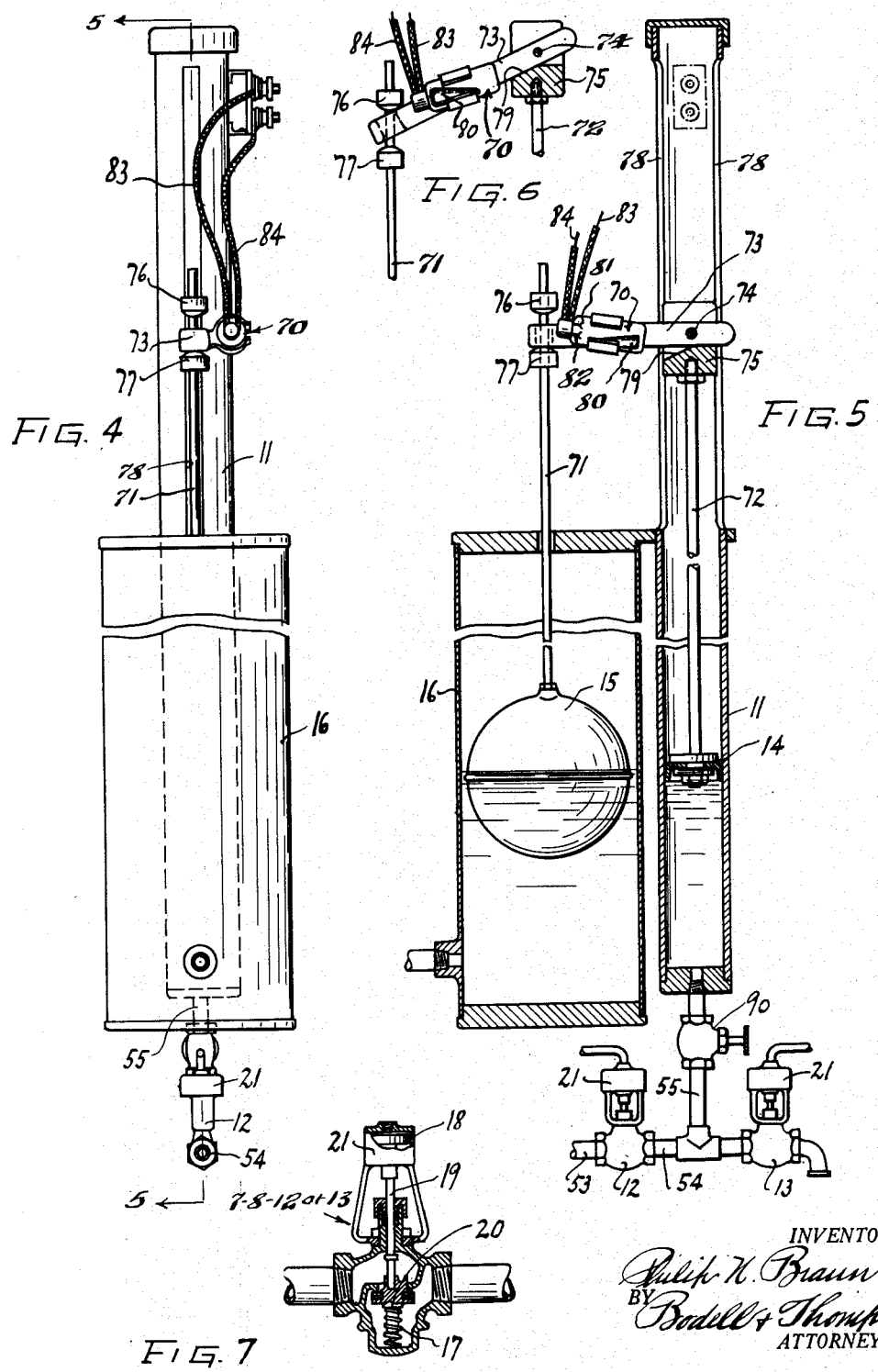

Patented Apr. 30, 1935

1,999,439

UNITED STATES PATENT OFFICE 1,999,439

LIQUID OR WATER LEVEL CONTROL

Philip N. Braun, Syracuse, N. Y., assignor to The Prosperity Company Inc., Syracuse, N. Y., a corporation of New York Application February 10, 1932, Serial No. 592,054

11 Claims. (Cl. 137—68)

This invention relates to a liquid, or water level control, by which the level of a liquid, or water, in a receptacle, tank, or chamber, may be accurately regulated, and has for its object a simple, efficient, and accurate, level control, by which a predetermined level is obtained regardless of variations in the water pressure from time to time. It further has for its object automatic means generally for presetting a member which controls the water level and more specifically means by which a predetermined level is controlled by a setting member operated by the leakage of a liquid at a predetermined rate from a chamber in which a presetting member is located and on which the liquid, in the presetting chamber, acts.

The invention consists in the novel features and in the combinations and constructions hereinafter set forth and claimed.

In describing this invention, reference is had to the accompanying drawings, in which like characters designate corresponding parts in all the views.

Figure 1 is a fragmentary elevation of a commercial laundry washing machine embodying my invention, the contiguous portion of a cycle timer mechanism being also shown, the dump valve being open, and the valve, which controls the flow of liquid to the presetting cylinder, being open.

Figure 2 is a view similar to Figure 1, the cycle timer mechanism being omitted, showing the dump valve closed and the drain valve of the presetting chamber open.

Figure 3 is a view similar to Figure 2, partly in section, showing the position of the control parts when the drain valve has been closed, and the presetting member set in its final position.

Figure 4 is an enlarged view of the float and the presetting piston and chamber, and contiguous parts.

Figure 5 is a sectional view on line 5—5, Figure 4.

Figure 6 is an enlarged, detail view of the control switch operated by the float and the presetting piston.

Figure 7 is a detail view of one of the control valves, all the control valves being similar.

Figure 8 is an enlarged, fragmentary view of the program sheet of the cycle timer.

Figure 9 is a detail view of the timer.

I have here illustrated my invention as applied to a commercial type of laundry washing machine.

In laundry washing machines there are in the course of a washing cycle several dumping and filling operations, and the receptacle or tank of the washing machine is filled to a predetermined level, the level varying for different loads and for different operations in the washing cycle of the same load. The level of the liquid depends on the time element, and on the water pressure. If the water pressure, or the rate of flow, decreases below a given pressure, a longer time element will be required to fill the receptacle or tank to a predetermined level and therefore, if the pressure varies the time element must also be varied. The time element is preferably controlled by a cycle timer.

The object of this invention is to preset a water level determining member, and control the level in the tank or receptacle by a float, or means performing the function of a float, co-operating with the presetting member to close the valve in the intake pipe for the tank or receptacle when the predetermined level determined by the presetting member is reached and the controlling of the presetting member. In the illustrated embodiment of my invention the setting of the presetting member is controlled by the leakage of liquid at a predetermined rate from the chamber of the presetting member or piston for a predetermined time, determined by the cycle timer. The rate of leakage, or the draining of the liquid from the presetting chamber, can be accurately determined as the flow, or the draining out is by gravity, or its equivalent, as a predetermined spring pressure or gravity plus the weight of the presetting member and parts.

I designates the tank, or receptacle, of a commercial laundry washing machine, this being usually a horizontal cylinder.

2 is the usual perforated drum or basket mounted in the cylinder to move about a horizontal axis, the drum being actuated in any suitable manner as will be understood by those skilled in the art, to rotate a certain number of times in one direction, and then reverse and rotate a predetermined number of times in the other direction, the reversals being repeated at regular intervals throughout the entire operation.

4 designates an intake pipe for the washing fluid, this communicating with hot and cold water pipes 5 and 6 which are connected to suitable sources of hot and cold water.

7 is a control valve in the hot water pipe, and 8 a control valve in the cold water pipe.

9 designates the dump valve. These valves are operated or controlled in their operation by a cycle timer, and the intake valves 7 and 8 are additionally controlled by the level control to shut them off, or close them when the predetermined level is reached, the cycle timer itself being set to hold the valves open for a maximum time, or for a time sufficient to permit the water to flow into the receptacle 1 to the highest level at the lowest pressure, and the water level control acts to take the closing of the valve out of the control of the cycle timer when the predetermined level is reached. As before stated, the timer is set so that the predetermined level will be reached at the lowest pressure before the timer reaches the point where it would cause the valves to close.

It will be understood that there are several conditions that would tend to vary the pressure. One of these conditions is that a plural number of washers may be filled at the same time from the same source, tank, or cylinder, causing the pressure to drop in the feed pipes to all of them. In its generic aspect the liquid level control comprises a shiftable presetting member, or part, shiftable to different selected positions, and timer-controlled means operable to shift said member, or part, and thereby automatically preset same to a selected or predetermined position to control and permit the closing valve in the feed pipe of the receptacle being filled, when a predetermined liquid level is reached.

More specifically the liquid or water level control comprises a presetting chamber as a cylinder 11 having an intake valve 12, and an outlet or drain valve 13, a movable member as a piston 14 in the cylinder and operable by the pressure of the liquid or water therein; a float 15 operated by the level of the liquid in the receptacle 1, or in a float chamber 16 with which the receptacle is provided, or to which it is connected; connections between the stem of the float and the piston rod and operable by movement of the float relative to the piston when the latter is in its preset position; a control member operated by the relative movement of these connections for closing the valves 7 or 8 whichever happens to be open, or both of them in case both of them are open, when the predetermined level is reached, timed means for opening the valve 12 to permit the liquid to enter the presetting cylinder and actuate the presetting member to a maximum position or height, and timed means for opening the drain valve 13 to permit the liquid to drain from the presetting chamber 11 at a predetermined rate, until the piston reaches the predetermined level.

The valves 12 and 13 are controlled by the cycle timer. Preferably, the valve heads of each of the valves 7, 8, 12, or 13, is as seen in Figure 7, closed by a spring 17 and opened by means of the piston 18 connected to the stem 19 of the valve head 20, the piston being movable in a cylinder 21 which is connected through a suitable pipe to a source of supply of motive fluid, as compressed air. The flow of motive fluid, as compressed air, is controlled by the timer. The dump valve 9 is also operated by a similar air cylinder 23 connected in the air system to the cycle timer. The piston in the cylinder 23, through suitable connections, actuates a rock arm 24 which depresses the usual pedal 25 of the dump valve. In commercial machines, the dump valve is usually operated by the pedal 25 and in applying my invention to the commercial washing machines, the power mechanism for the dump valve conveniently acts on the pedal 25.

The cycle timer may be of any suitable form, size, and construction, and per se forms no part of this invention. The cycle timer here shown, is of the type described in pending application of Walter B. Hutchings, Sr. No. 494,176, filed November 7, 1930, although any work cycle timer may be used.

The work cycle timer here shown includes a program or formula sheet 26 of insulation as paper. This is mountable upon a turn table 26ª, which is actuated by an electric motor, or other timed movement. The turn table is a conductor and connected in an electric circuit. The program sheet 26 is provided with slots 27, 28, 29, and 30, and several other slots in accordance with the washing formula. A series of contacts 31, 32, 33, 34, are paired with the slots, there being one contact for each slot or row of slots, and the contacts make contact with a terminal common to all of them, this terminal being usually the turn table underlying the formula sheet 26. When any one of the contacts is in register with its companion slot, a branch circuit is closed thereby and remains closed as long as the contact is in register with the slot. The contact 31 and the slot 27 control the opening of the dump valve 9, the slot 29 and its contact 33 control the opening of the hot water valve 7, and the slot 30 and its contact 34 the opening of the cold water valve 8, and these slots are long enough so that the valves, insofar as the contact is concerned, may be open for a maximum time, but the closing of the valves 7, 8, is controlled by the water level control, or by the opening of the circuits closed by the contacts 33, 34, through the slots 29, 30, before the slots 29, 30, have moved out of register with the contacts 33, 34. The contacts 31, 32, 33, and 34, thus control the flow of air to the dump valve cylinder 23, and the cylinders 21 of each of the valves 7, 8, 12 and 13. The flow of air is controlled by suitable valves 35, 36, 37, and 38, in air pipes which communicate with a header 39 which is connected by a feed pipe 40 to any suitable supply of compressed air. Each of the valves 35, 36, 37, and 38, is operated by a magnet or solenoid 41, 42, 43 or 44.

The windings of the solenoid 41 are connected in the feed circuit through the contact 31 and slot 27, and the windings of each of the other solenoids 42, 43, and 44, are connected in the feed circuits through the contacts 32, 33, and 34, when in register with the slots 28, 29, and 30, respectively.

In operation, assuming that the slot 27 is in register with the contact 31, the current passes from feed wire 45, through wire 46, to the terminal 47 and turn table 26ª common to all of the contacts, thence through the contact 31, wire 48, through the windings of the magnet 41, thence to the other feed wire 49. When the magnet 41 is energized its armature 50 is attracted, thus causing the valve 35 to open, and permitting air to flow from the header 39 through the valve 35, pipe 51, to the cylinder 23 and actuate the piston therein to open the dump valve 9. At the same time, air passes from the pipe 51, through a branch 52, to the cylinder 21, which operates the head of the valve 12 permitting water, or other liquid to pass from a suitable feed pipe 53, through the valve, and through pipes 54, 55, into the bottom end of the presetting cylinder 11 and actuate the piston 14 therein upwardly to its full extent. The dump valve 9 remains open as long as the contact 31 is in register with the slot 27. When the slot 28 registers with the contact 32, a circuit is closed from the feed line 45, through the wire 46, and terminal 42, to the turn table 26ᵃ, thence through contact 32, and wire 56, windings of the magnet 42, thence through wire 57 to the other line wire 49 causing the magnet 42 to attract its armature 58 and open the air valve 36 permitting air to flow from the header 39 through pipe 59 to the cylinder 21 of the drain valve 13, opening said drain valve and permitting the liquid to drain at a fixed rate out of the presetting cylinder 11 as long as the valve 13 is open, the piston 14 following down as the liquid recedes in the cylinder 11.

The drain valve remains open as long as the contact 32 is in register with the slot 28. When the drain valve 13 closes, the piston 14 is accurately preset to determine the level in the tank 1, as will be presently described.

After the presetting of the piston 14, or just before the end of the presetting operation, the slot 29 may come into register with the contact 33 and thus establish a circuit from the feed line 35 through wire 46, terminal 47, turntable 26ᵃ, contact 33, wire 60, windings of magnet 43 and thence, through a cut out switch, to be presently described, back to wire 49, thus opening the hot water valve 7, or the cold water valve 8 may be opened when the slot 30 of the formula sheet registers with contact 34, establishing a circuit from the feed wire 49, wire 46, terminal 47, turn table 26ᵃ, contact 34, wire 61, windings of electro-magnet 44 and thence through the cut out switch, to be described, back to the line wire 49.

70 designates the cut-out switch which is in a broad sense a control member for controlling the closing of the hot and cold water valve, this switch being operated by the relative movement of the float 15 and the piston 14 when it is in its preset position and is carried by connections between the rod or stem 71 of the piston and the rod 72 of the piston.

In the illustrated embodiment of my invention, the float 14 is coupled to the piston rod 72 to be carried upwardly therewith and to settle downwardly while the liquid is draining out of the presetting cylinder 11 and hence, to meet the rising liquid in the receptacle, or in the float chamber 16 which is in communication therewith, and the connections are such that when the float does meet the level of the rising liquid in the float chamber and is buoyed up thereby, it moves upwardly and operates the switch 70. The piston 14 thus presets the float, or the connections between it and the float so that they will be operated by the liquid when it reaches a predetermined level.

The connections between the piston rod 72 and the float rod 71 are here shown as a lever or rocking cross head 73 pivoted at 74 to a block 75 at the upper end of the piston rod 72, and connected at its other end to the float rod 71, by a lost motion connection consisting of two spaced apart shoulders 76 and 77. The block 75 moves in a suitable extension of the presetting cylinder 11, which extension is provided with a lengthwise slot 78 through which the lever 73 extends, and the block 75 is provided with a shoulder 79 for limiting the downward movement of the lever. The cut out or control switch 70 is operated by the relative movement or tilting of the lever 73 and is here shown as a mercury tumbler switch, normally in the position shown in Figure 6 wherein the body of mercury 80 submerges the terminals 81, 82 and hence, closes the circuit through wires 83 and 84, connected respectively in circuit with the windings of the magnet 43, 44, and to the line wire 49. A suitable hand set regulating valve 90 is provided in the pipe 55.

In operation, when the dump valve 9 is opened and also the valve 12 opened, as before described, water passes through the valve 12 and pipes 54 and 55 to the presetting cylinder 11 moving the piston 14 upwardly to its full extent carrying the float 15 upwardly therewith, the cut out switch 70 being in its closed position, as shown in Figure 6. The dump valve 9 and the valve 12, being controlled by the contact 31, are closed when the slot 27 moves out of register with the contact 31. Thereafter, the valve 13 is opened by reason of the slot 28 registering with the contact 32 and when open, permits the fluid to drain from the presetting cylinder 11 as long as the slot 28 is in register with the contact 32.

During the draining out of the liquid from the presetting cylinder 14, the float 15 is carried downwardly to a predetermined height in the float chamber 16. Thereafter, either the hot or cold water valve 7 or 8 is open, or both of them, dependent on the relative position of the slots 29, 30, but one position being shown in the drawings, Figure 8. As before stated, these slots are of a maximum extent to permit the water to flow into the tank 1 to the highest level at the lowest pressure. As the water rises in the tank 1 and float chamber 16 and meets the float 15 and buoys up the same, the connection or lever 73 is tilted upwardly into position shown in Figures 3 and 5, thus tilting the mercury switch 70 and breaking the circuit to the magnets 43 or 44, or both of them, so that the hot or cold water valves, or both of them, are closed when the predetermined level is reached. It is obvious that the level is accurately determined and regulated by a fixed condition or element, that is, the draining of the liquid at a fixed rate from the presetting cylinder 14 and not by any element or condition that varies from time to time, and further that the element can be varied from one accurate condition to another by varying the length of the slot 28.

It will be borne in mind that the laundryman makes his own formula sheets 26 to suit the conditions in his laundry and that different loads for the washing machine require different formulas and further, that the laundryman standardizes as far as possible, the loads and has a formula sheet for each load in accordance with his classification. The laundryman will therefore have several formula sheets in accordance with the classification he has worked out for his laundry.

What I claim is:

1. The combination of a receptacle having an inlet pipe for a liquid, valve means for controlling the flow through said pipe, a timer, means operated thereby for controlling the opening and closing of the valve means, means operated by a predetermined level of liquid in the receptacle for controlling and permitting the closing of said valve means including a movable element operated by the liquid, a presetting member, a movable connection between said element and the presetting member and operable by the movement of said element relatively to the presetting member, a controller operable by the movement of said connections, and means operated by the timer for presetting said presetting member.

2. The combination of a receptacle having an inlet pipe for a liquid, valve means for controlling the flow through said pipe, a timer, means controlled by the timer for controlling the opening and closing of the valve means, means operated by a predetermined level of liquid in the receptacle for controlling and permitting the closing of the valve means including a movable element operated by the liquid in the receptacle, a presetting member, movable connections between said element and the presetting member and operable by the movement of said element relatively to the presetting member, a controller operable by the relative movement of said connections, a pressure chamber in which the presetting member is located, an inlet and an outlet for said chamber having valves therein, means operated by the timer for operating the valves to open the inlet to permit the liquid in said chamber to operate the presetting member to its fullest extent and to open the outlet valve to permit a predetermined amount of liquid to drain from said chamber to control and permit the closing of the outlet after a predetermined period.

3. The combination of a receptacle having an inlet pipe for a liquid, valve means for controlling the flow through said pipe, the receptacle having a float chamber and an element operated by the level of the liquid, presetting means including a cylinder having a piston therein, an inlet pipe for the cylinder having a valve therein, an outlet having a control valve therein, connections between the piston and said element, said connections being movable relative to said element and the piston upon movement of said element by the liquid in the float chamber, a timer and means operated thereby for controlling the opening and closing of the inlet valve of the receptacle and the inlet and outlet valves of said cylinder, and a control member operable by the movement of said connections by said element for controlling and permitting the closing of the inlet valve of the receptacle.

4. The combination of a receptacle having an inlet pipe for a liquid, valve means for controlling said pipe, means for controlling the opening and closing of the valve means, an element operated by a predetermined level of the liquid in the receptacle for controlling the closing of said valve means including a chamber having an inlet and an outlet for a liquid, and a presetting member actuated by the liquid in the chamber for setting the effective position of said element at a predetermined level, means for opening the inlet valve of said chamber to actuate the presetting member to a predetermined maximum amount, a timer and means operated thereby for controlling the opening and control and permit the closing of the outlet valve to permit a predetermined amount of liquid to drain from said chamber and thereby set the presetting member in a predetermined position.

5. The combination with a receptacle having an inlet pipe for a liquid, a valve for controlling the flow of liquid through said pipe, means for controlling the opening and closing of the valve, means for controlling the closing of the valve including a chamber having a valve controlled inlet for a liquid and a valve controlled outlet, a presetting member in the chamber to be actuated by the liquid therein, a timer, means operated by the timer for opening the inlet valve of said chamber to actuate the presetting member to a predetermined maximum amount and to open and control and permit the closing of the outlet valve to permit a predetermined amount of liquid to drain from said chamber and thereby set the presetting member at a predetermined point, an element operated by the level of the liquid in the receptacle, cooperating parts between said element and the presetting member and operable by the movement of said element relatively to the presetting member, when the latter is in its preset position, and a member operated by the cooperating parts for controlling the operation of the first means to control the closing of the intake valve of the receptacle, when a predetermined level is reached.

6. The combination of a receptacle having an inlet pipe for a liquid, valve means for opening and closing said pipe, means for controlling the closing of said valve means including an element controlled by the level of the liquid in the receptacle, means for presetting the effective position of said element at a predetermined level including a cylinder having a piston therein, an inlet and outlet for the cylinder, each having a valve therein, a timer, means operated thereby for operating the inlet valve, whereby the piston is actuated to a maximum extent, and means operated by the timer for opening and controlling and permitting the closing of the outlet for said cylinder for a predetermined time whereby the piston is stopped at a predetermined point, connections between said element and the piston movable by the relative movement of said element by the liquid in the receptacle, and a member controlled by the movement of said connections for controlling the closing of the inlet valve of the receptacle.

7. The combination of a receptacle having an inlet pipe for a liquid, a valve for controlling the flow through said pipe, means for controlling the opening and closing of the valve, and means operated by the level of the liquid in the receptacle for operating the valve controlling means including an element controlled by the level of the liquid in the receptacle, a presetting member and chamber in which it is located, the chamber having an inlet, and also an outlet from which the liquid flows by gravity, a timer and means operated thereby for opening the inlet valve of the chamber to actuate the presetting member a predetermined maximum distance and for controlling and permitting the closing of the same and for controlling the opening and permitting the closing of the outlet valve of the chamber, whereby a predetermined amount of liquid drains from the presetting chamber and a controller for controlling the closing of the first mentioned valve, said controller being operated by the differential movement of said element and the presetting member.

8. The combination of a receptacle having an inlet pipe for a liquid, a valve for controlling the flow of liquid through said pipe, a timer, means operated by the timer for controlling the opening and closing of the valve, an element operated by the level of the liquid in the receptacle, a presetting member, means controlled by the timer for actuating the presetting member a predetermined amount, a controller for controlling the closing of the first mentioned valve, and means operated by the differential movement of said element and the presetting member for operating the controller.

9. The combination of a receptacle having an inlet pipe for a liquid, valve means for controlling the flow of liquid through said pipe, a timer, means operated by the timer for controlling the opening and closing of said valve means, means operated by the level of the liquid in the receptacle, means operated by the liquid-level-operated means for controlling and permitting the closing of said valve means, the liquid-level-operated means including a part shiftable to different levels, and means operated by the timer for shifting to different levels said part.

10. The combination of a receptacle having an inlet pipe for a liquid, valve means for controlling the liquid through said pipe, a timer, means controlled thereby for effecting the opening and closing of the valve means, means operated by the level of the liquid in the receptacle for controlling and permitting the closing of said valve means and including a part shiftable to different selected positions, and means operated by the timer for shifting said part, and thereby presetting the same to a selected position to control and permit the closing of the valve means when a predetermined liquid level is reached.

11. The combination of a receptacle having an inlet pipe for a liquid, valve means for controlling the flow through said pipe, a timer means controlled thereby for effecting the opening and closing of the valve means, means operated by the level of the liquid in the receptacle for controlling and permitting the closing of said valve means, including a part shiftable to different selected positions, and means controlled by the timer for automatically shifting said part to a predetermined selected position to control the closing of the valve means when the liquid level reaches the selected predetermined level.

PHILIP N. BRAUN.